United States Patent
Satomura

(10) Patent No.: US 10,452,932 B2
(45) Date of Patent: Oct. 22, 2019

(54) INFORMATION PROCESSING DEVICE

(71) Applicant: DENSO CORPORATION, Kariya, Aichi-pref. (JP)

(72) Inventor: Shota Satomura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 286 days.

(21) Appl. No.: 15/282,166

(22) Filed: Sep. 30, 2016

(65) Prior Publication Data
US 2017/0103272 A1   Apr. 13, 2017

(30) Foreign Application Priority Data

Oct. 9, 2015   (JP) .................................. 2015-201246

(51) Int. Cl.
*H04N 7/18* (2006.01)
*G06K 9/00* (2006.01)
*B60Q 9/00* (2006.01)

(52) U.S. Cl.
CPC ........... *G06K 9/00818* (2013.01); *B60Q 9/00* (2013.01)

(58) Field of Classification Search
CPC .............................. G06K 9/00818; B60Q 9/00
See application file for complete search history.

(56) References Cited

U.S. PATENT DOCUMENTS

| | | | | |
|---|---|---|---|---|
| 9,836,968 B2 * | 12/2017 | Poechmueller | ........ | G08G 1/056 |
| 2008/0062008 A1 * | 3/2008 | Morimoto | .............. | G01C 21/36 |
| | | | | 340/936 |
| 2011/0121992 A1 * | 5/2011 | Konaka | ................ | B62D 15/029 |
| | | | | 340/905 |
| 2012/0265435 A1 * | 10/2012 | Yu | ....................... | G01C 21/3415 |
| | | | | 701/423 |
| 2013/0080047 A1 | 3/2013 | Kobayashi et al. | | |
| 2013/0085976 A1 * | 4/2013 | Bone | ............... | B60W 30/18163 |
| | | | | 706/46 |
| 2013/0338850 A1 * | 12/2013 | Takahara | .......... | G01C 21/3697 |
| | | | | 701/1 |

(Continued)

FOREIGN PATENT DOCUMENTS

| | | | |
|---|---|---|---|
| JP | 2007-293390 A | 11/2007 | |
| JP | 2009-122744 A | 6/2009 | |

(Continued)

*Primary Examiner* — Leron Beck
(74) *Attorney, Agent, or Firm* — Knobbe, Martens, Olson & Bear, LLP

(57) ABSTRACT

In an information processing device mounted on a vehicle, a sign recognition section detects a traffic sign from image data captured by and transmitted from an in-vehicle camera. A judgment section detects a direction to a prohibited roadway/lane based on the detected traffic sign. To the prohibited roadway/lane the vehicle is prohibited from approaching and entering. An operation detection section predicts, as a predicted driver's operation, whether or not the driver intends to move the vehicle in the detected direction to the prohibited roadway/lane. A warning control section instructs a display and an audio speaker to provide warning information to the driver when the predicted driver's operation indicates that the driver intends to move the own vehicle toward the detected direction to the prohibited roadway/lane.

8 Claims, 5 Drawing Sheets

(56) References Cited

U.S. PATENT DOCUMENTS

| | | | | |
|---|---|---|---|---|
| 2014/0119605 A1* | 5/2014 | Zobel | ................ | G06K 9/00818 |
| | | | | 382/103 |
| 2015/0077273 A1* | 3/2015 | Alshinnawi | ...... | G08G 1/096783 |
| | | | | 340/928 |
| 2015/0127190 A1* | 5/2015 | Fuehrer | ................ | B60W 30/09 |
| | | | | 701/1 |
| 2016/0176341 A1* | 6/2016 | Raghu | ................ | G06K 9/00798 |
| | | | | 348/148 |
| 2016/0217688 A1* | 7/2016 | Jeschke | ............. | G06K 9/00798 |
| 2016/0225256 A1* | 8/2016 | Hofsaess | ................ | G08G 1/056 |

FOREIGN PATENT DOCUMENTS

| | | |
|---|---|---|
| JP | 2009-140250 | 6/2009 |
| JP | 2009-193507 A | 8/2009 |
| JP | 2012-058948 A | 3/2012 |
| JP | 2015-121952 A | 7/2015 |

\* cited by examiner

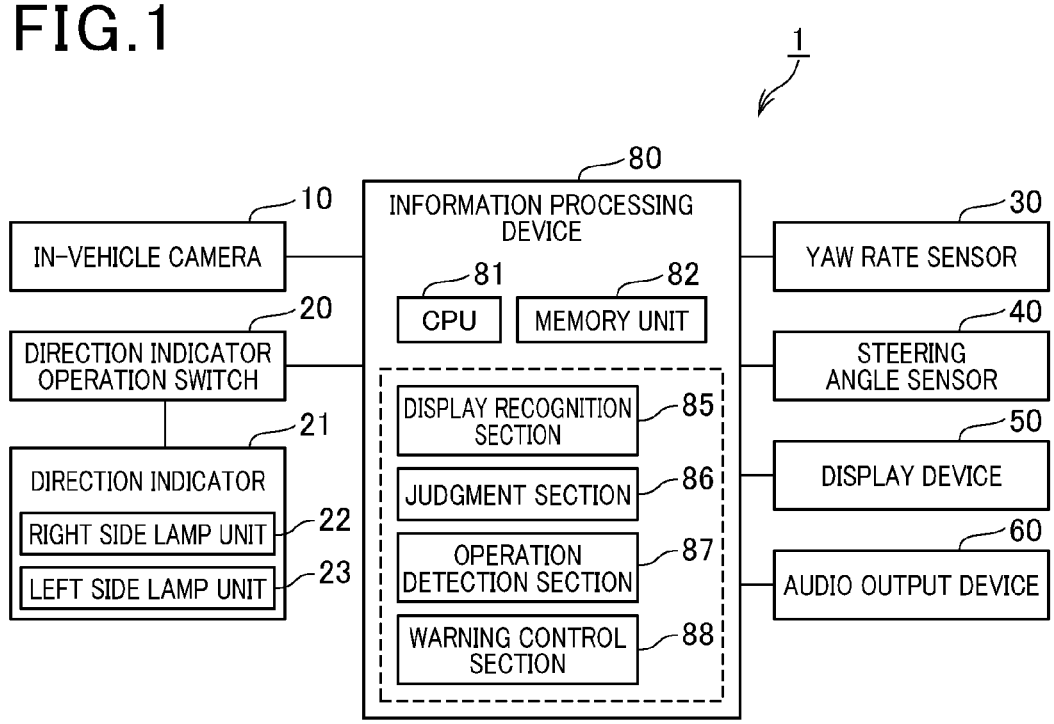

INFORMATION PROCESSING DEVICE

CROSS-REFERENCE TO RELATED APPLICATION

This application is related to and claims priority from Japanese Patent Application No. 2015-201246 filed on Oct. 9, 2015, the contents of which are hereby incorporated by reference.

BACKGROUND OF THE INVENTION

1. Field of the Invention

The present invention relates to information processing device for vehicles capable of preventing occurrence of wrong-way driving.

2. Description of the Related Art

There has been known and used a vehicle technique capable of detecting occurrence of wrong-way driving of an own vehicle on the basis of image data captured by and transmitted from an in-vehicle camera mounted on the own vehicle. Wrong-way driving (WWD) is the act of driving a motor vehicle against the direction of traffic.

For example, patent document 1, Japanese patent laid open publication No. JP 2007-293390, has disclosed a conventional technique capable of detecting whether or not a traffic sign is located at a right side or a left side on a roadway on which an own vehicle is running. This technique detects occurrence of wrong-way driving on the basis of the detected location of the traffic sign.

As previously described, because the conventional technique detects the location or installed position of a traffic sign on the roadway, and detects occurrence of wrong-way driving on the basis of the detected traffic signs, it is difficult for the conventional technique to correctly detect occurrence of wrong-way driving only before the own vehicle has entered a prohibited roadway and started wrong-way driving.

SUMMARY

It is therefore desired to provide an information processing device for vehicles capable of quickly and correctly detecting occurrence of wrong-way driving of an own vehicle with high accuracy before approaching and entering a prohibited roadway/lane, and reliably suppressing occurrence of wrong-way driving.

An exemplary embodiment provides an information processing device for vehicles. The information processing device has a computer system including a central processing unit. The computer system is configured to provide a sign recognition section, a judgment section, an operation detection section and a warning control section. The sign recognition section detects and recognizes signs on the basis of outside image data captured by an in-vehicle camera mounted on an own vehicle. The signs represent a direction to a prohibited roadway/lane, to which vehicles are prohibited from approaching and entering.

The judgment section detects and determines the direction to the prohibited roadway/lane to which the own vehicle is prohibited from approaching and entering from a vehicle lane on which an own vehicle is running on the basis of the signs detected by the sign recognition section. The operation detection section predicts, as a predicted driver's operation to the own vehicle, whether or not the driver of the own vehicle intends to move the own vehicle to the detected direction to a prohibited roadway/lane. The warning control section instructs a warning unit to provide warning information to the driver of the own vehicle when the predicted driver's operation indicates that the driver of the own vehicle intends to move the own vehicle in the detected direction to the prohibited roadway/lane.

In the information processing device having the structure previously described, because the sign recognition section, judges, i.e. detects and recognizes the direction to the prohibited roadway/lane on the basis of the detected sign which represents a one-way direction, the warning control section instructs the warning unit, for example, a display unit and an audio speaker unit to provide warning information to the driver of the own vehicle when the operation detection section has predicted that the driver's operation of the own vehicle causes entry to the prohibited roadway/lane. This structure makes it possible to promptly provide the warning information to the driver of the own vehicle when the driver moves the own vehicle in the direction to the prohibited roadway/lane, and prevent occurrence of wrong-way driving of the own vehicle at early stage with high accuracy.

BRIEF DESCRIPTION OF THE DRAWINGS

A preferred, non-limiting embodiment of the present invention will be described by way of example with reference to the accompanying drawings, in which:

FIG. 1 is a view showing a block diagram of a structure of an information processing device for vehicles according to an exemplary embodiment of the present invention;

FIG. 2 is a table showing a relationship between signs (traffic signs) and traffic sign-set location, and directions to prohibited roadway/lane;

DETAILED DESCRIPTION OF THE PREFERRED EMBODIMENTS

Figure 3:
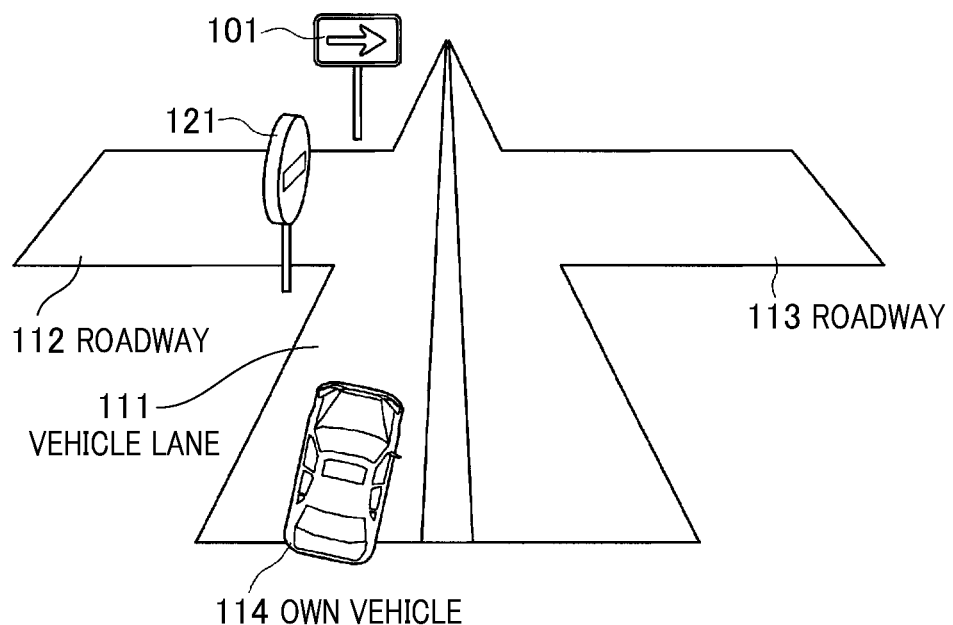
FIG. 3 is a view showing an intersection on which a one-way traffic sign 101 has been installed.

Hereinafter, various embodiments of the present invention will be described with reference to the accompanying drawings. In the following description of the various embodiments, like reference characters or numerals designate like or equivalent component parts throughout the several diagrams.

EXEMPLARY EMBODIMENT

A description will be given of a structure and behavior of an information processing device for vehicles according to an exemplary embodiment with reference to FIG. 1 to FIG. 8.

FIG. 1 is a view showing a block diagram of a schematic structure of the information processing device 80 according to the exemplary embodiment.

(Structure)

An information processing system 1 having the information processing device 80 according to the exemplary embodiment shown in FIG. 1 is mounted on an own vehicle 114. The information processing system 1 is equipped with an in-vehicle camera 10, a direction indicator operation switch 20 (hereinafter, the operation switch 20), a yaw rate sensor 30, a steering angle sensor 40, a display device 50, an audio output device 60, the information processing device 80, etc. The information display system 1 is mounted on the own vehicle 114.

The in-vehicle camera 10 sequentially acquires front images in front of the own vehicle 114. The in-vehicle camera 10 is arranged on the back of a rear view mirror of the own vehicle 114 in order to capture front images of the road surface of a roadway in a forward direction of the own vehicle 114, for example. The in-vehicle camera 10 captures front images of the own vehicle 114 every predetermined period of time, and outputs the captured image data to the information processing device 80.

The operation switch 20 is arranged near a steering wheel of the own vehicle 114 in order for the driver of the own vehicle 114 to operate the operation switch 20. The operation switch 20 instructs the direction indicator 21 of the own vehicle 114 to blink to show the direction to which the driver intends to operate the vehicle 114 to turn right or left.

The direction indicator 21 has a right side lamp unit 22 and a left side lamp unit 23. The right side lamp unit 22 of the direction indicator 21 is arranged at the right side of the own vehicle 114. The left side lamp unit 23 of the direction indicator 21 is arranged at the left side of the own vehicle 114.

The driver of the own vehicle 114 operates the operation switch 20 so that one of the right side lamp unit 22 and the left side lamp unit 23 is blinking.

That is, when the driver of the own vehicle 114 operates the operation switch 20, the operation switch 20 generates and outputs a turn signal to the direction indicator 21. One of the right side lamp unit 22 and the left side lamp unit 23 is selected and driven on the basis of the turn signal transmitted from the operation switch 20, to blink in order to show the driver's intended turning-direction.

The operation switch 20 further transmits the generated turn signal to the information processing device 80. The operation switch 20 corresponds to an input device.

The yaw rate sensor 30 detects a turn direction of the own vehicle 114 and a turn angle, and outputs a yaw rate value to the information processing device 80. This turn direction indicates the direction to which the own vehicle 114 moves when viewed from the traveling direction of the own vehicle 114. The turn angle indicates a magnitude of the turn motion of the own vehicle 114.

The yaw rate value has a positive sign or a negative sign which indicates the detected turn direction of the own vehicle 114. For example, the positive sign of the yaw rate value indicates the right turn direction when viewed from the traveling direction of the own vehicle 114, and the negative sign of the yaw rate value indicates the left turn direction when viewed from the traveling direction of the own vehicle 114. Further, the absolute value of the yaw rate value with a sign indicates a magnitude of the turn angle. The yaw rate value indicates the rightward direction or leftward direction.

The steering angle sensor 40 detects a steering angle of the steering wheel (not shown) of the own vehicle 114, and outputs to the information processing device 80 a detection signal corresponding to a turn angle of the steering shaft engaged with the steering wheel.

The display device 50 is arranged inside of the own vehicle 114, and has a display window such as a liquid crystal display to display images on the basis of the control signals transmitted from the information processing device 80.

The audio output device 60 has one or more speaker units arranged inside of the compartment of the own vehicle 114, and outputs audio information on the basis of the control signals transmitted from the information processing device 80.

The display device 50 and the audio output device 60 provide warning information to the driver of the own vehicle 114 when it is predicted for the own vehicle 114 to approach and enter the direction to which vehicles are prohibited from approaching and entering. Specifically, the display device 50 displays warning text "NO RIGHT TURN" or "NO LEFT TURN" on the display window thereof. Further, the audio output device 60 outputs alarm and audio warning "NO RIGHT TURN" or "NO LEFT TURN". The display device 50 and the audio output device 60 correspond to a warning device.

The information processing device 80 is realized by using an available microcomputer system having a central processing unit (CPU) 81 and some semiconductor memories (hereinafter, a memory unit 82). The memory unit 82 has a random access memory (RAM), a read only memory (ROM), a flash memory, etc.

The information processing device 80 executes various control processes to perform various types of functions to assist and support the driving of the own vehicle 114. For example, the CPU 81 in the information processing device 80 reads out various types of programs stored in the memory unit 82 as a non-transitory solid-state storage medium, and executes the programs having various functions. It is acceptable for the information processing device 80 to be realized by using one or more microcomputer systems.

As shown in FIG. 1, the CPU 81 in the information processing device 80 provides specific functions comprised of a display recognition section 85, a judgment section 86, an operation detection section 87 and a warning control section 88. The information processing device 80 executes the programs to provide the functions of the display recognition section 85, the judgment section 86, the operation detection section 87 and the warning control section 88. It is acceptable to use a hardware assembly composed of logical circuits, analogue circuits and/or a combination of them to realize the functions of the display recognition section 85, the judgment section 86, the operation detection section 87 and the warning control section 88.

The display recognition section 85 detects one or more signs on the basis of image data acquired by the in-vehicle camera 10. The signs indicate a direction to a roadway/lane to which the own vehicle 114 is prohibited from approaching and entering and moving. For example, there are various types of traffic signs with "NO ENTRY" symbol and "ONE WAY" symbol, and traffic signs representing the direction to which vehicles is permitted to move, and traffic sign markings painted on the surface of roadways. The display recognition section 85 executes a known pattern matching process using the image data captured by the in-vehicle camera 10 to recognize these traffic signs and markings.

The exemplary embodiment uses traffic signs and markings which indicate the direction to a prohibited roadway/lane to which the own vehicle 114 is prohibited from approaching and entering. It is also possible for the information processing device 80 according to the exemplary embodiment shown in FIG. 1 to use another types of traffic signs and markings which indicate a permission direction to which the own vehicle 114 is permitted to approach and enter because another direction other than the permission direction prevents the own vehicle 114 from approaching and entering.

In other words, the traffic signs representing the direction to the permitted roadway/lane.

Because it is possible to detect the direction to the permitted roadway/lane to which the own vehicle 114 is permitted to approach and enter, and further to detect the direction to the prohibited roadway/lane simultaneously. The signs to be used by the information processing device 80 according to the exemplary embodiment have wide concept including the inhibition direction indicated by traffic signs and markings.

The judgment section 86 detects the direction to the prohibited roadway/lane which prohibits the own vehicle 114 from approaching and entering on the basis of the sign detected by the display recognition section 85.

A description will now be given of the explanation of the relationship between the signs with direction arrow symbols and the direction to a prohibited roadway/lane with reference to FIG. 2.

FIG. 2 is a table which explains the relationship between signs (traffic signs) and location of signs, and direction to the prohibited roadway/lane.

The signs or symbols shown in FIG. 2 are examples to be used for detecting the direction to a prohibited roadway/lane to which the own vehicle 114 is prohibited from approaching and entering. It is possible for the information processing device 80 according to the exemplary embodiment to use other signs and symbols in order to detect the direction to the prohibited roadway/lane.

The signs 101 and 102 shown in FIG. 2 are the same one-way traffic sign which shows a one-way sign with a one-way arrow symbol. Each of the signs 101 and 102 varies its direction to the prohibited roadway/lane due to the installation position thereof.

FIG. 3 is a view showing an intersection at which the one-way traffic sign 101 has been installed. At the intersection shown in FIG. 3, a vehicle lane 111 on which the own vehicle 114 is running, a left-side roadway 112 and a right-side roadway 113 intersect with each other.

The own vehicle 114 is running on the vehicle lane 111. The one-way traffic sign 101 and a no-entry traffic sign 121 are installed on the intersection shown in FIG. 3.

Because the traffic sign 121 is located in the direction which is perpendicular to the forwarding direction of the own vehicle 114, it is difficult for the information processing device 80 to correctly detect the traffic sign 121 on the basis of the image data captured by the in-vehicle camera 10.

On the other hand, the traffic sign 101 is installed along the left-side roadway 112, i.e. located at the corner of the intersection over the left-side roadway 112 when viewed from the current position of the own vehicle 114, where the vehicle lane 111 and the left-side roadway 112 intersect with each other on the intersection. As shown in FIG. 3, because the traffic sign 101 with a one-way arrow symbol is installed at the left side in the traveling direction of the own vehicle 114, the traffic sign 101 prohibits the own vehicle 114 from approaching to and entering into the left-side roadway 112. This case prohibits the left-turn of the own vehicle 114. That is, the direction to a prohibited roadway/lane to which the own vehicle 114 is prohibited from approaching and entering is the left turn direction of the own vehicle 114.

Figure 4:
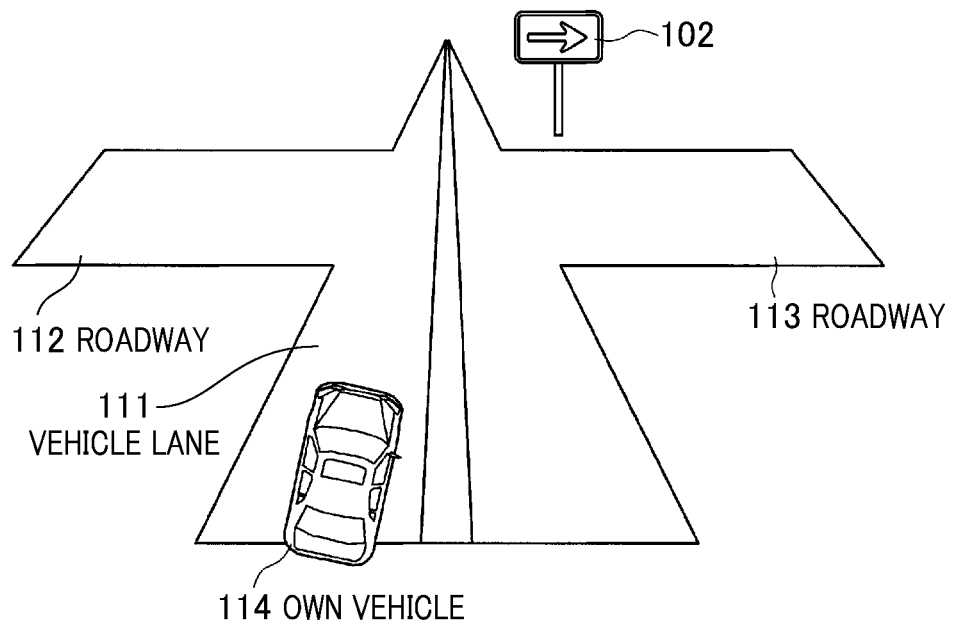
FIG. 4 is a view showing another intersection on which a one-way traffic sign 102 has been installed.

FIG. 4 is a view showing another intersection on which the one-way traffic sign 102 has been installed. As shown in FIG. 4, the sign 102 is installed at the intersection along the right-side roadway 113 when viewed from the own vehicle 114 on the vehicle lane 111. That is, when the sign 112 is located at right side in the direction of the traveling direction of the own vehicle 114 on the vehicle lane 111, the sign 102 permits the own vehicle 114 to turn right and enter the right-side roadway 113. This case has no direction to a prohibited roadway/lane to which the own vehicle 114 is prohibited from approaching and entering.

That is, the judgment section 86 detects, as a direction to a prohibited roadway/lane to which the own vehicle 114 is prohibited from approaching and entering, a direction toward an installation position of the detected traffic sign 101 (see FIG. 3) when the detected traffic sign 101 representing the one-way traffic information permits vehicles moving in the direction toward the roadway 112 which faces the vehicle lane 111 and intersects with the vehicle lane 111 on which the own vehicle 114 is running.

The information processing device 80 according to the exemplary embodiment distinguishes the traffic sign 101 shown in FIG. 3 from the traffic sign 102 shown in FIG. 4 on the basis of the detection whether or not the traffic sign is located at the right side or left side when viewed from the vehicle lane 111 on which the own vehicle 114 is running. This detection method can be achieved by detecting the location of the traffic sign in the captured image data, for example.

It is possible to use another method capable of correctly detecting whether or not the traffic sign is located at the right side or left side on the basis of the location of the vehicle lane 111. For example, it is possible to detect the location of the vehicle lane 111 first, and detect the location position of the traffic sign on the basis of the detected location of the vehicle lane 111.

Figure 5:
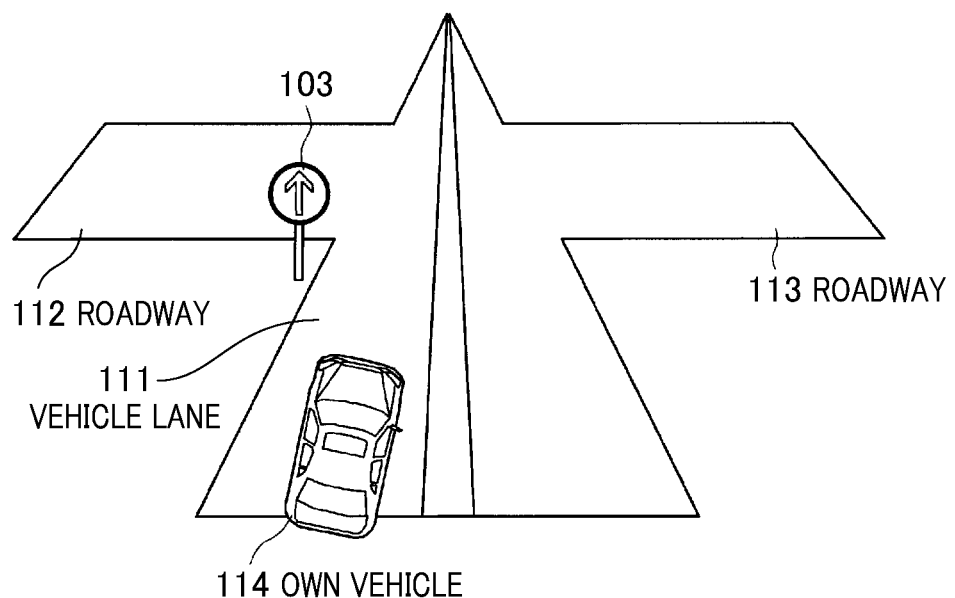
FIG. 5 is a view showing an intersection on which a one-way traffic sign 103 has been installed, and the one-way traffic sign 103 permits vehicles to move in one direction, and prohibits vehicles from approaching and entering roadways/lanes in other directions.

FIG. 5 is a view showing an intersection on which a one-way traffic sign 103 has been installed, and the one-way traffic sign 103 permits the own vehicle 114 to move forward and prohibits the own vehicle 114 from moving in other directions.

The sign 103 shown in FIG. 2 is a traffic sign to permit vehicles to approach and enter in the forward direction at an intersection.

As shown in FIG. 5, when the sign 103 is installed at the left side shoulder on the vehicle lane 111 at the intersection, the own vehicle 114 is prohibited from making a turn right and turn left to approach and enter in the left-side roadway 112 and the right-side roadway 113. In this case shown in FIG. 5, each of the left side direction and the right-side direction becomes the direction to the prohibited roadway/lane for the own vehicle 114.

FIG. 2 does not show the concrete installation position of each of the signs 104 to 107.

A description will now be given of the installation of the signs 104 to 107 at the intersections shown in FIG. 3 to FIG. 5.

The installation position of each of the signs 104 to 107 is not limited so long as each of the signs 104 to 107 is installed at the position where the driver of the own vehicle 114 can correctly recognize the content of each of the signs 104 to 107 and the direction to the prohibited roadway/lane at the intersection, or installed at specific area regulated by traffic law to show the direction to the prohibited roadway/lane.

Because the sign 104 is a traffic sign to permit vehicles to move in the rightward direction, the direction to the prohibited roadway/lane becomes the left side direction and the forward direction.

Because the sign 105 is a traffic sign to permit vehicles to make a right turn, the direction to the prohibited roadway/lane is the left side direction and the forward direction.

Further, because the sign 106 is a traffic sign to permit vehicles to move in the forward direction and make a right turn, the direction to the prohibited roadway/lane becomes only the left side direction.

Still further, because the sign 107 is a traffic sign to prohibit vehicles from making a right turn, the direction to the prohibited roadway/lane becomes the rightward direction only.

Figure 6:
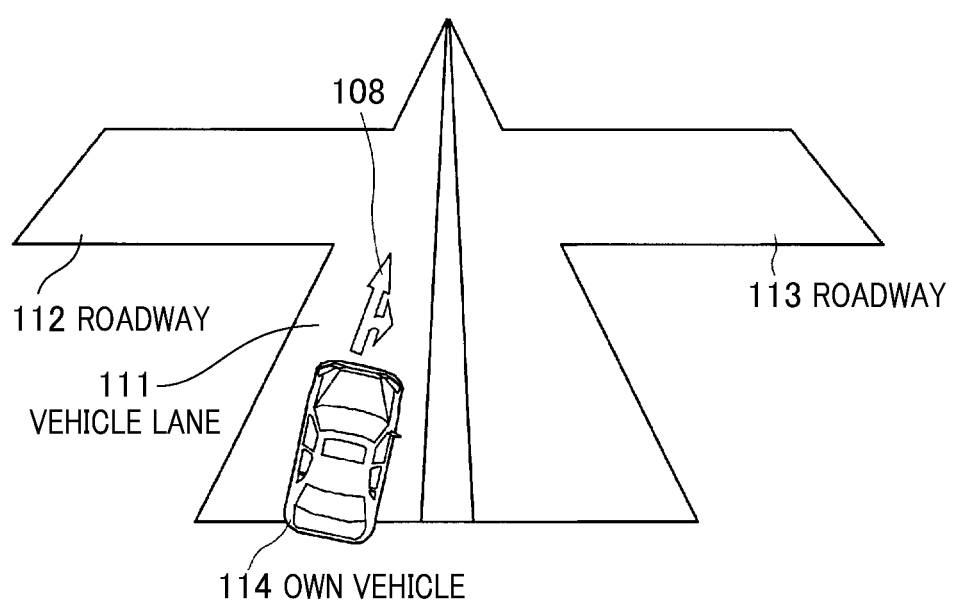
FIG. 6 is a view showing an intersection with an arrow-shaped road surface marking 108 which permits the own vehicle 114 to move in two directions.

FIG. 6 is a view showing an intersection with an arrow-shaped road surface marking 108 which permits the own vehicle 114 to approach and enter into two directions.

As shown in FIG. 6, it is possible for the information processing device 80 to detect the sign 108 as a traffic sign, and determine the direction to a prohibited roadway/lane to which vehicle are prohibited from approaching and entering on the basis of the detected traffic sign. The sign 108 is a traffic sign to permit vehicles to move forward in the forward direction and to make a right turn, and the direction to the prohibited roadway/lane becomes a left direction.

Each of FIG. 3 to FIG. 6 has shown the intersection from which the four roadways are extended in different directions. However, the concept of the present invention is not limited by this type of the intersection. For example, it is possible to apply the concept of the information processing device 80 according to the exemplary embodiment to various types of intersections, for example, a junction or intersection with three roadways, an intersection with four roadways.

The operation detection section 87 detects a predicted operation of the driver of the own vehicle 114 capable of detecting that the driver of the own vehicle 114 to approach and enter the prohibited roadway/lane detected by the judgment section 86.

Specifically, the operation detection section 87 detects that the driver of the own vehicle 114 operates the operation switch 20 to blink on and off the right side lamp unit 22 or the left side lamp unit 23 arranged in the direction to the prohibited roadway/lane.

The warning control section 88 instructs the display unit 50 and the audio output device 60 as the warning unit to provide warning to the driver of the own vehicle 114 when the operation detection section 87 has predicted that the driver's operation of the own vehicle 114 approaches and enters in the direction to the prohibited roadway/lane.

(Processing)

Next, a description will now be given of the warning process performed by the CPU 81 in the information processing device 80 with reference to FIG. 7.

Figure 7:
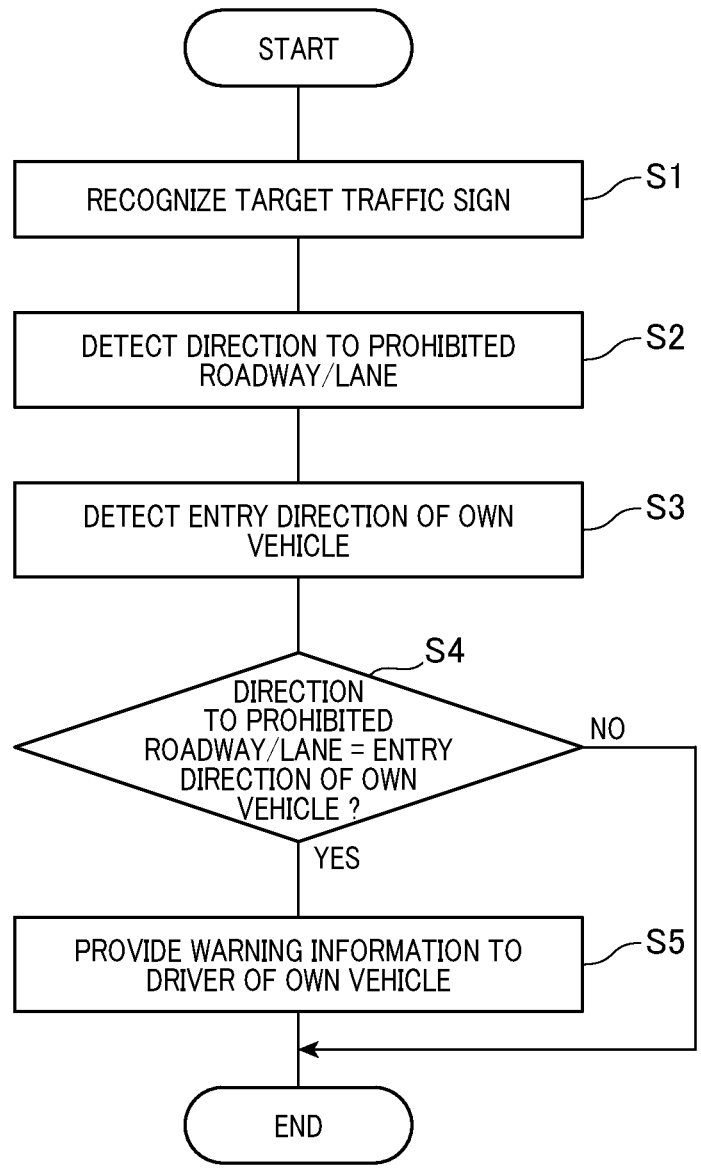
FIG. 7 is a flow chart showing a warning process performed by the information processing device according to the exemplary embodiment shown in FIG. 1.

FIG. 7 is a flow chart showing the warning process performed by the information processing device 80 according to the exemplary embodiment shown in FIG. 1.

The CPU 81 in the information processing device 80 repeatedly performs the warning process shown in FIG. 7 when an accessory power source (not shown) is turned on.

In step S1 shown in FIG. 7, the CPU 81 detects a target sign from captured image data. Specifically, the CPU 81 detects the target sign, i.e. a traffic sign and a traffic marking representing a direction to a prohibited roadway/lane to which vehicles are prohibited from approaching and entering on the basis of image data captured by the in-vehicle camera 10. The process of step S1 performed by the CPU 81 corresponds to the function of the sign recognition section 85. The operation flow progresses to step S2.

In step S2, the CPU 81 detects the direction to the prohibited roadway/lane indicated by the target sign detected in step S1. The process of step S2 performed by the CPU 81 corresponds to the function of the judgment section 86. The operation flow progresses to step S3.

In step S3, the CPU 81 detects the traveling direction of the own vehicle 114. That is, the CPU 82 predicts a traveling direction of the own vehicle 114 on the basis of the operation of the driver of the own vehicle 114 to the operation switch 20. This predicted traveling direction of the own vehicle 114 indicates the direction to which the own vehicle 114 progresses.

Specifically, when the driver of the own vehicle 114 operates the right side lamp unit 22 of the direction indicator 21 to blink, the CPU 81 judges that the own vehicle 114 starts a right turn, and on the other hand, operates the left side lamp unit 23 of the direction indicator 21 to blink, the CPU 81 judges that the own vehicle 114 starts a left turn. When the driver of the own vehicle 114 does not operate the direction indicator 21, the CPU 81 judges that the own vehicle 114 continues to move straight toward the forward direction. The operation flow progresses to step S4.

In step S4, the CPU 81 detects whether or not the direction to the prohibited roadway/lane detected in step S2 coincides with the traveling direction of the own vehicle 114 detected in step S3.

When the detection result in step S4 indicates affirmation ("YES" is step S4), i.e. indicates that the direction to the prohibited roadway/lane detected in step S2 coincides with the traveling direction of the own vehicle 114 detected in step S3, the operation flow progresses to step S5.

On the other hand, when the detection result in step S4 indicates negation ("NO" is step S4), i.e. indicates that the direction to the prohibited roadway/lane detected in step S2 does not coincide with the traveling direction of the own vehicle 114 detected in step S3, the CPU 81 finishes the warning process shown in FIG. 7.

The processes in step S3 and step S4 corresponds to the function of the operation detection section 87.

In step S5, the CPU 81 instructs the display device 50 and the audio output device 60 to provide warning information to the driver of the own vehicle 114. As previously described, the CPU 81 instructs the display device 50 to inform the fact that the own vehicle 114 approaches to and enters the prohibited roadway/lane, for example, display warning text "NO RIGHT TURN" or "NO LEFT TURN" on the display window of the display window of the display device 50, and the audio output device 60 outputs alarm and audio warning "NO RIGHT TURN" or "NO LEFT TURN". After the process of step S5, the CPU 81 finishes the warning process shown in FIG. 7. The warning process shown in the flow chart of FIG. 7 corresponds to the function of the warning control section 88.

(Effects)

A description will be given of the effects of the information processing device 80 according to the exemplary embodiment.

(1a) The information processing device 80 according to the exemplary embodiment instructs the display device 50 and the audio output device 60 to provide warning information to the driver of the own vehicle 114 when the driver of the own vehicle 114 has operated the direction indicator 21 to blink on and off one of the right side lamp unit 22 and the left side lamp unit 23 arranged at the detected direction to the prohibited roadway/lane.

In general, because the driver of the own vehicle 114 operates the operation switch 20 before entry to an intersection, it is possible for the information processing device 80 to detect the direction to a prohibited roadway/lane to which the own vehicle 114 is prohibited from approaching and entering before occurrence of wrong-way driving of the own vehicle 114. This makes it possible to avoid and suppress the occurrence of wrong-way driving of the own vehicle 114 with high accuracy.

(1b) The information processing device 80 according to the exemplary embodiment detects the direction to the prohibited roadway/lane on the basis of the installation position of the detected traffic sign which represents one-way at an intersection of roadways and the vehicle lane 111 on which the own vehicle 114 is running. That is, it is possible for the information processing device 80 according to the exemplary embodiment to correctly detect the direction to the prohibited roadway/lane on the basis of the detected traffic signs indicating one-way regions.

(Other Modifications)

A description will now be given of various modifications of the information processing device 80 according to the exemplary embodiment.

That is, the concept of the present invention is not limited by the exemplary embodiment previously described. It is possible for the present invention to provide various modifications (2a) to (2f) of the information processing device 80 according to the exemplary embodiment.

(2a) The exemplary embodiment previously described shows that the CPU 81 instructs the display device 50 and the audio output device 60 to provide warning information to the driver of the own vehicle 114 when the operation detection section 87 has detected the driver's operation to the operation switch 20. However, the concept of the present invention is not limited by this. For example, it is acceptable for the CPU 81 to instruct the display device 50 and the audio output device 60 to provide warning information to the driver of the own vehicle 114 when predicts that the own vehicle 114 approaches to and enters the direction to the prohibited roadway/lane.

Figure 8:
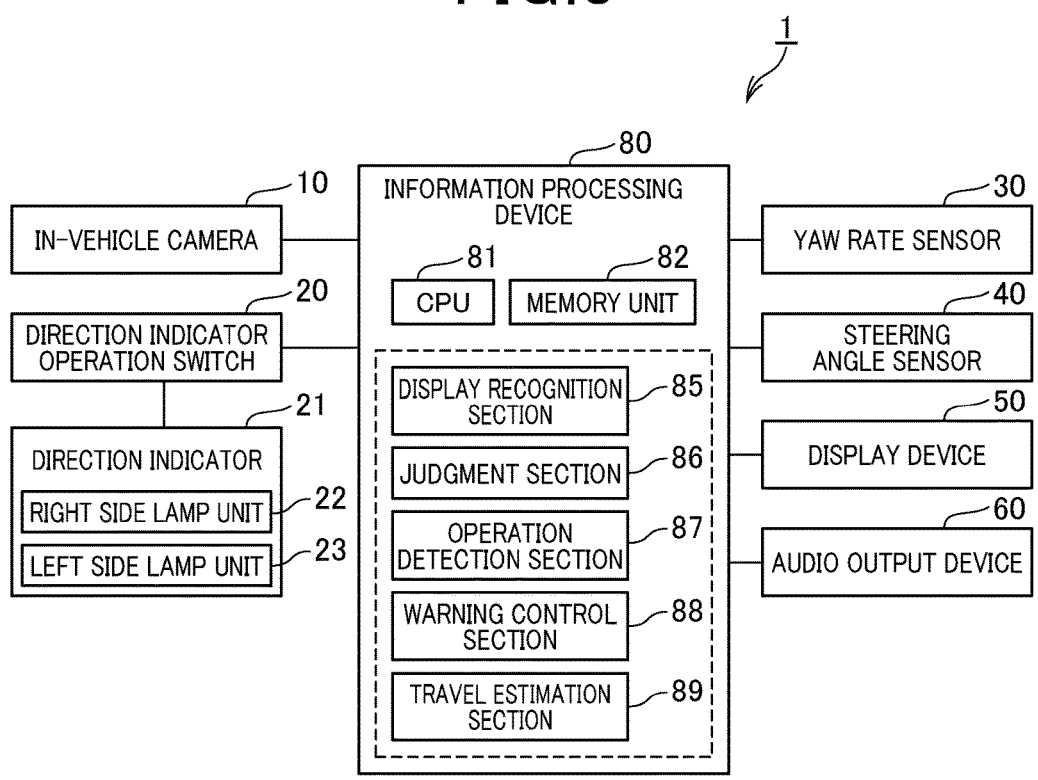
FIG. 8 is a view showing a block diagram of another structure of an information processing device according to a modification of the exemplary embodiment of the present invention.

FIG. 8 is a view showing a block diagram of another structure of the information processing device according to a modification of the exemplary embodiment.

The information processing device 80*a* according to a modification has a structure shown in FIG. 8. As shown in FIG. 8, the information processing device 80*a* further has a travel estimation section 89 when compared with the information processing device 80 shown in FIG. 1. The travel estimation section 89 estimates a prohibited direction travelling state in which the own vehicle 114 progresses toward the direction to the prohibited roadway/lane. That is, the information processing device 80*a* detects occurrence of the prohibited direction travelling state when at least one of following conditions (i) and (ii) is satisfied.

Condition (i):

A steering angle of the steering wheel of the own vehicle 114 becomes not less than an angle value in which the own vehicle 114 surely enters the direction to the prohibited roadway/lane detected by the judgment section 86.

It is possible for the travel estimation section 89 to predict that the own vehicle 114 starts turn right or turn left on the basis of the detected steering angle of the steering wheel of the own vehicle 114. Accordingly, when the direction of the turn left or turn right coincides with the detected direction to the prohibited roadway/lane, it is possible for the travel estimation section 89 to correctly predict that the own vehicle 114 progresses toward the direction to the prohibited roadway/lane.

Further, when the direction to the prohibited roadway/lane indicates the forward direction of the own vehicle 144, it is possible for the CPU 81 to correctly detect that the own vehicle progresses toward the direction to the prohibited roadway/lane on the basis of the detected steering angle because the detected steering angle becomes small.

The angle value of the steering wheel of the own vehicle 114 to be used by the exemplary embodiment is not particularly limited. It is possible for the CPU 81, i.e. the travel estimation section 89 to use a specific angle value which is larger than an angle range when the own vehicle travels straight in front of the own vehicle 114.

Condition (ii):

The steering angle of the steering wheel of the own vehicle 114 becomes within an angle range at which the own vehicle 114 enters in the direction to the prohibited roadway/lane detected by the judgment section 86.

When the own vehicle 114 turns right or left at an intersection, the own vehicle 114 goes round the intersection, for example. When the turning direction of the own vehicle 114 coincides with the detected direction to the prohibited roadway/lane, and an amount of the turning angle is not less than a predetermined threshold angle, it is possible for the CPU 81 to predict that the own vehicle 114 goes to the detected direction to the prohibited roadway/lane. For example, it is possible for the CPU 81 to use an angle of 30 degrees as the predetermined threshold angle.

The travel estimation section 89 detects the estimated prohibited direction travelling state of the own vehicle 114 when at least one of the conditions (i) and (ii) is satisfied. It is also acceptable for the travel estimation section 89 to estimate the prohibited direction travelling state of the own vehicle 114 on the basis of another condition other than these conditions (i) and (ii).

The information processing device 80*a* having the structure previously described can reliably judge the correct travelling state of the own vehicle 114 even if the own vehicle 114 progresses toward the detected direction to the prohibited roadway/lane, and thereby suppress unnecessary warning from providing to the driver of the own vehicle 114. According to the present invention, because the timing when the information processing device 80, 80*a* provides the warning information to the driver of the own vehicle 114 is the time when the driver of the own vehicle 114 has operated the steering wheel to move the own vehicle 114 toward the detected direction to the prohibited roadway/lane, this makes it possible to provide prompt warning to the driver of the own vehicle before the own vehicle 114 starts entry to the prohibited roadway/lane. The information processing device 80, 80*a* according to the exemplary embodiment and modification can promptly and correctly detect occurrence of wrong-way driving of the own vehicle 114 when compared with conventional devices which detect occurrence of the wrong-way driving after vehicles have enter the prohibited roadway/lane and started the wrong-way traveling.

(2b) The exemplary embodiment has shown that the operation detection section 87 detects the driver's operation to the operation switch 20. However, the concept of the present invention is not limited by this. It is acceptable for the operation detection section 87 to detects the driver's operation to another device of the own vehicle 114 in order to predict that the own vehicle 114 enters the prohibited roadway/lane.

For example, it is acceptable for the operation detection section 87 to detect the driver's operation to the steering wheel to move the own vehicle 114 toward the detected direction to the prohibited roadway/lane, and use the detection result as the predicted driver's operation to the own vehicle 114 to approach and enter the prohibited roadway/lane.

In addition, it is also acceptable for the operation detection section 87 to detect at least one of specific cases, and use the detection result as the predicted operation to enter the own vehicle 114 to the prohibited roadway/lane, where one of the specific case is whether or not a distance of the own vehicle 114 to a roadway to which vehicles are prohibited to approach and enter is not more than a predetermined threshold distance, and the other case is whether or not a time for the own vehicle 114 to reach the target roadway to which vehicles are prohibited to approach and enter is not more than a predetermined threshold time. Specifically, it is possible to use, as the predicted driver's operation, one or more selected from the driver's operation to the brake pedal of the own vehicle 114, the driver's operation to the reduction of the accelerator, the operation to the gear stick of the own vehicle 114, etc.

(2c) The information processing device 80, 80*a* according to the exemplary embodiment previously described provides the warning information to the driver of the own vehicle 114 through the display device 50 and the audio output device 60. However, the concept of the present invention is not limited by this. For example, it is acceptable to provide the warning information by using other devices, for example, using room lamps arranged inside of the compartment of the own vehicle 114, vibrating the driver's seat or the steering wheel of the own vehicle 114.

(2d) It is acceptable to use a portable device as the information processing device which is installed inside of the own vehicle 114 and detached from the own vehicle 114. It is also possible for the information processing device to have a function to communicate with other units and devices arranged in the own vehicle 114 through a wired network or a wireless network.

(2e) It is possible to divide each of the components forming the information processing device or combine two or more components forming the information processing device according to demands.

That is, while the specific exemplary embodiment and modification according to the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

(2f) It is possible to provide the information display system 1 having the information processing device 80, 80*a* according to the present invention. Further, it is also possible to realize the functions of the information processing device 80, 80*a* by using programs stored in a non-transitory solid-state storage medium such as semiconductor memories, and execute these programs.

What is claimed is:

1. An information processing device comprising:
    a central processing unit (CPU) connected to a vehicle with an in-vehicle camera, the CPU configured to provide:
        a sign recognition section detecting a one-way traffic sign with an arrow located on a first roadway at an intersection with four roadways, the intersection including an own-vehicle roadway on which the own vehicle is running, the one-way traffic sign being detected in image data captured by the in-vehicle camera;
        a judgment section detecting a prohibited direction, which the own vehicle is prohibited from entering, based on a relative position between a current location of the own vehicle and a location of the detected one-way traffic sign;
        an operation detection section predicting whether a driver of the own vehicle intends to move the own vehicle toward the prohibited direction in response to the driver's operation of the vehicle; and
        a warning control section instructing the own vehicle to provide warning information to the driver in response to the predicted driver's operation indicating that the driver intends to move the own vehicle toward the prohibited direction,
        wherein the judgment section recognizes a direction toward the location of the detected one-way traffic sign as the prohibited direction in response to the arrow of the one-way traffic sign indicating a direction toward a roadway that intersects the own-vehicle roadway at the intersection with the four roadways.

2. The information processing device according to claim 1, wherein a direction indicator mounted on the own vehicle comprises a right-side lamp unit and a left-side lamp unit, and
    the operation detection section detects, as the predicted driver's operation to the own vehicle, the driver's operation of the direction indicator to blink one of the right-side lamp unit and the left-side lamp unit.

3. The information processing device according to claim 2, further comprising:
    a travel estimation section which detects a specific travelling state of the own vehicle, the specific travelling state of the own vehicle indicating at least one of a condition (i) and a condition (ii),
        in the condition (i), a steering angle of a steering wheel of the own vehicle becomes an angle within a range in which the own vehicle approaches the prohibition direction, and
        in the condition (ii), a turning angle and amount of the own vehicle is within a range in which the own vehicle is moving in the prohibited direction,
    wherein the warning control section instructs the own vehicle to provide warning information to the driver of the own vehicle in response to the operation detection section detecting an occurrence of the predicted driver's operation, and in response to the travel estimation section detecting the specific travelling state.

4. The information processing device according to claim 1, wherein
    the judgment section recognizes the prohibition direction based on whether the prohibition direction is changed due to the location of the own vehicle and the location of the detected one-way traffic sign, or changed regardless of the location of the own vehicle and the location of the detected one-way traffic sign.

5. A method of providing warning information to a driver of an own vehicle, comprising:
    detecting, based on image data captured with a camera connected to the own vehicle, a one-way traffic sign with an arrow located on a first roadway at an intersection with four roadways, the intersection including an own-vehicle roadway on which the own vehicle is running;

detecting a prohibited direction which the own vehicle is prohibited from entering based on a relative position between a current location of the own vehicle and a location of the detected one-way traffic sign, the prohibited direction being recognized as a direction toward the location of the detected one-way traffic sign in response to the arrow of the one-way traffic sign indicating a direction toward a roadway that intersects the own-vehicle roadway at the intersection with the four roadways;

predicting whether the driver of the own vehicle intends to move the own vehicle toward the prohibited direction in response to the driver's operation of the own vehicle; and instructing the own vehicle to provide warning information to the driver in response to the predicted driver's operation indicating that the driver intends to move the own vehicle toward the prohibited direction.

6. The method according to claim 5, further comprising:
detecting, as the predicted driver's operation to the own vehicle, the driver's operation of a direction indicator to blink one of a right-side lamp unit and a left-side lamp unit of the own vehicle.

7. The method according to claim 6, further comprising:
detecting a specific travelling state of the own vehicle, the specific travelling state of the own vehicle indicating at least one of a condition (i) and a condition (ii),
in the condition (i), a steering angle of a steering wheel of the own vehicle becomes an angle within a range in which the own vehicle approaches the prohibition direction, and
in the condition (ii), a turning angle and amount of the own vehicle is within a range in which the own vehicle is moving in the prohibited direction; and
instructing the own vehicle to provide warning information to the driver of the own vehicle in response to detecting an occurrence of the predicted driver's operation, and in response to detecting the specific travelling state.

8. The method according to claim 5, further comprising:
recognizing the prohibition direction based on whether the prohibition direction is changed due to the location of the own vehicle and the location of the detected one-way traffic sign, or changed regardless of the location of the own vehicle and the location of the detected one-way traffic sign.

* * * * *